United States Patent
Matsuzaki et al.

(10) Patent No.: US 8,044,601 B2
(45) Date of Patent: Oct. 25, 2011

(54) HIGH VOLTAGE DISCHARGE LAMP LIGHTING DEVICE

(75) Inventors: Nobutoshi Matsuzaki, Osaka (JP); Hiroyasu Eriguchi, Osaka (JP); Takeshi Goriki, Kyoto (JP); Takeshi Kamoi, Kyoto (JP); Naoki Komatu, Hyougo (JP); Jun Kumagai, Osaka (JP); Satoru Nagata, Uozakikita-machi (JP); Daisuke Yamahara, Osaka (JP); Akira Yufuku, Hyougo (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 393 days.

(21) Appl. No.: 12/410,595

(22) Filed: Mar. 25, 2009

(65) Prior Publication Data
US 2010/0013398 A1    Jan. 21, 2010

(30) Foreign Application Priority Data

Mar. 25, 2008  (JP) ................................ 2008-079043

(51) Int. Cl.
*H05B 37/00*  (2006.01)
*H02M 3/35*  (2006.01)

(52) U.S. Cl. ........ 315/219; 315/274; 315/278; 315/291; 363/21.11; 363/21.08

(58) Field of Classification Search .......... 315/219–224, 315/226, 274–278, 287, 308; 363/21.08, 363/21.11, 21.15, 21.16, 97
See application file for complete search history.

(56) References Cited

U.S. PATENT DOCUMENTS

| | | | |
|---|---|---|---|
| 7,035,121 B2 * | 4/2006 | Umetsu | 363/21.11 |
| 7,492,615 B2 * | 2/2009 | Morota et al. | 363/21.16 |
| 2010/0327775 A1 * | 12/2010 | Komatsu et al. | 315/307 |

FOREIGN PATENT DOCUMENTS

JP    2007052977    3/2007

* cited by examiner

*Primary Examiner* — Vibol Tan
(74) *Attorney, Agent, or Firm* — Waddey & Patterson, P.C.; Mark J. Patterson

(57) ABSTRACT

A high-voltage discharge lamp lighting device provides a starting pulse voltage sufficient to turn on a high-voltage discharge lamp having terminal wire connections of variable length. A power conversion circuit is coupled to a commercial AC power source input and rectifies the AC input into a predetermined DC voltage output. A charging capacitor is coupled to the power conversion circuit. A full bridge circuit is coupled to the power conversion circuit and the charging capacitor and provides a rectangular wave AC output signal to a transformer primary winding circuit of at least a capacitor, a single switching element and a primary winding of a transformer. A low pulse voltage is induced in the primary winding and a transformer secondary winding is connected on one end to the high-voltage discharge lamp, wherein the low pulse voltage is stepped up to a high pulse voltage and applied to the high-voltage discharge lamp. A reference voltage is generated in a reference transformer winding representative of the high pulse voltage. A starting pulse equivalent value detection circuit is connected to the reference winding and detects a value associated with the reference voltage. A control circuit receives said value from said detection circuit, and variably controls at least one of a frequency of the single switching element or an ON impedance of the single switching element in association with said value, wherein said frequency or ON impedance is further associated with a starting pulse voltage sufficient to start the high-voltage discharge lamp.

21 Claims, 8 Drawing Sheets

HIGH VOLTAGE DISCHARGE LAMP LIGHTING DEVICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japanese Patent Application No. JP2008-079043, filed Mar. 25, 2008

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a high-voltage discharge lamp lighting device equipped with means adapted to adjust a peak value of a high-pressure pulse voltage at the time of start. The present invention further relates to a lighting fixture using the device.

A high-voltage discharge lamp is compact, yet can produce powerful beams of light, is near a point light source and is easily controlled in light distribution. For these reasons, the high-voltage discharge lamp has recently become a favorable alternative to incandescent and halogen lamps. A high-pressure pulse voltage of a few kV is generally required to start the high-voltage discharge lamp.

FIG. 14 shows a typical example of circuit structure for such a lamp. Reference character E denotes a DC power source, reference numeral 4 denotes a step-down chopper circuit, reference numeral 6 denotes a polarity reversal circuit, reference numeral 7 denotes a starting pulse generation circuit and reference character T1 is a high-voltage pulse transformer. The step-down chopper circuit 4 is formed of a switching element Q2, a diode D2, an inductor L3 and a smoothing capacitor C4. The configuration and operation of these components are generally known in the art and further description thereof is omitted. The polarity reversal circuit 6 is formed of a full-bridge circuit including switching elements Q3 to Q6 and applies a rectangular wave having a frequency of from a few dozen to a few hundred Hz to the starting pulse generation circuit 7 and the high-voltage discharge lamp 8.

The starting pulse generation circuit 7 has the transformer T1 including a secondary winding N2 serially connected to the high-voltage discharge lamp 8, a capacitor C1 for passing a pulse current to a primary winding N1, a charge resistor Rc and a switching element Q7 for discharging the capacitor C1.

The pulse generation operation is well known. For example, when the switching elements Q3 and Q6 of the polarity reversal circuit 6 are turned on and the switching elements Q4 and Q5 are turned off, a charge current flows from the capacitor C4 to the capacitor C1 via the switching element Q3, the primary winding N1 of the transformer T1, the charge resistor Rc, the capacitor C1 and the switching element Q6 to charge the capacitor C1 so that the switching element Q7 becomes positive. After that, when the switching elements Q3 and Q6 of the polarity reversal circuit 6 are turned off and the switching elements Q4 and Q5 are turned on, a high voltage obtained by adding the voltage of the capacitor C4 to the voltage of the capacitor C1 is applied to the switching element Q7 and exceeds a breakover voltage of the switching element Q7. As a result, an electric charge of the capacitor C1 is steeply discharged via the switching element Q7 and the steep discharge current flows into the primary winding N1 of the high-voltage pulse transformer T1, generating a pulse voltage. A high-pressure pulse voltage obtained by boosting the pulse voltage by the transformer T1 occurs in the secondary winding N2 to cause dielectric breakdown of the high-voltage discharge lamp 8. Generally, in the high-voltage discharge lamp 8, the starting pulse voltage is defined as 3-5 kV.

In the high-voltage discharge lamp lighting device, when the output wiring length (lamp terminal wire length) is increased, output capacitance increases and the starting pulse voltage is attenuated. This causes a problem that the starting pulse voltage of the lamp falls below a defined value and thus the lamp cannot be started. To prevent this problem. the high-voltage discharge lamp lighting device needs to be able to output 3-5 kV even when the output wiring length is relatively long. In this case, however, when the output wiring length is short, the pulse voltage becomes 5 kV or more, resulting in a possibility of leakage in the wiring or socket.

Japanese Unexamined Patent Publication No. 2007-52977 describes a previous attempt to address this problem. FIG. 15 shows the circuit structure of this particular example. A starting pulse generation circuit operates at the start-up of the high-voltage discharge lamp 8 and generates a high-pressure pulse voltage. The starting pulse generation circuit has a transformer T1, a switching element Q7 which can be turned on/off according to an external control signal, a capacitor C1 and an inductor L1 for over-current protection of the switching element Q7. This document proposes that a tertiary winding N3 of the transformer T1, a voltage divider circuit 11 and a pulse detection circuit 12 detect a peak value of the high-pressure pulse voltage and feed back the detection value so that a control circuit 9 may maintain the starting high voltage within a predetermined value.

However, the starting high voltage must be lowered to a voltage desired for feedback and a circuit structure such as a voltage divider circuit is required to lower the starting high voltage, leading to an increase in size and costs of the lighting device. This method is disadvantageous in part because the peak value of the starting high voltage cannot be accurately detected due to error factors such as an inherent variation in components of the voltage divider circuit and temperature characteristics. Further, since the peak value of the starting high voltage varies in generation timing, it is difficult to detect the accurate peak value depending on detection timing.

BRIEF SUMMARY OF THE INVENTION

According to a first aspect of the invention as shown in FIG. 1, a high-voltage discharge lamp lighting device includes a rectangular wave output circuit (a power conversion circuit B and full bridge circuits Q3 to Q6) for supplying rectangular wave AC power to a high-voltage discharge lamp 8, a starting pulse generation circuit 7 for generating a starting high voltage necessary for turning on the high-voltage discharge lamp 8 and a control circuit 9 for controlling the starting pulse generation circuit 7.

The starting pulse generation circuit 7 has a transformer primary winding circuit comprising series connection of at least a capacitor C1, a primary winding N1 of a transformer T1 and a switching element Q7; a transformer secondary winding circuit for raising a voltage generated in the primary winding N1 of the transformer T1 and applying a high-voltage pulse to the high-voltage discharge lamp 8; and a transformer winding N3 for detecting a voltage level of the high-voltage pulse generated in the transformer T1.

A starting pulse equivalent value detection circuit 16 capable of detecting a value equivalent to a peak value of the starting pulse voltage generated by the starting pulse generation circuit 7 is connected to the transformer winding N3. The starting pulse voltage is adjusted to a desired value by indirectly detecting the peak value of the starting pulse voltage via the starting pulse equivalent value detection circuit 16 and controlling the starting pulse generation circuit 7 by use of the control circuit 9.

According to a second aspect of the invention, the starting pulse equivalent value detection circuit is more specifically a pulse width detection circuit 16 for detecting a pulse width of starting high voltage waveform (FIG. 1, FIG. 3).

According to a third aspect of the invention, the starting pulse equivalent value detection circuit is a pulse tilt detection circuit 17 for detecting a tilt of the starting high voltage waveform (FIG. 8, FIG. 9).

According to a fourth aspect of the invention, the starting pulse equivalent value detection circuit has at least one reference level and is a pulse level detection circuit 18 for comparing the starting high voltage waveform and the at least one reference level (FIG. 10, FIG. 11).

According to a fifth aspect of the invention, with respect to any of the previously described aspects the lamp terminal wire length is at least 2 m (FIG. 13).

A sixth aspect of the invention comprises a lighting fixture having the high-voltage discharge lamp lighting device according to any of the first to fifth aspects of the present invention (FIG. 12).

According to the first aspect of the invention, indirect detection of the peak value of the pulse voltage results in an inexpensive circuit structure, as a voltage reduction circuit with high accuracy is generally not required. Because of the simplified circuit structure, the influence of variation in parts of the detection circuit, temperature characteristics and the like is reduced. The result is therefore that accurate detection can be achieved and stability of the pulse voltage with higher accuracy can also be obtained.

According to the second aspect of the invention, since a detection value corresponding to the peak value of the pulse voltage can be obtained merely by detecting the pulse width in a relatively low voltage region, high-accuracy measurement means such as a microcomputer can be used as the detection circuit.

According to the third aspect of the invention, since a detection value corresponding to the peak value of the pulse voltage can be obtained merely by detecting the tilt of voltage waveform in a relatively low voltage region, high-accuracy measurement means such as a microcomputer can be used as the detection circuit.

According to the fourth aspect of the invention, since a detection value corresponding to the peak value of the pulse voltage can be obtained merely by comparing magnitude of the reference voltage levels in multiple stages, the structure of the detection circuit can be simplified.

According to the fifth and sixth aspects of the invention, there are advantages such as for example improved ease of construction, in that the ballast can be installed together and the ballast can be inspected together.

DETAILED DESCRIPTION OF THE INVENTION

Figure 1:
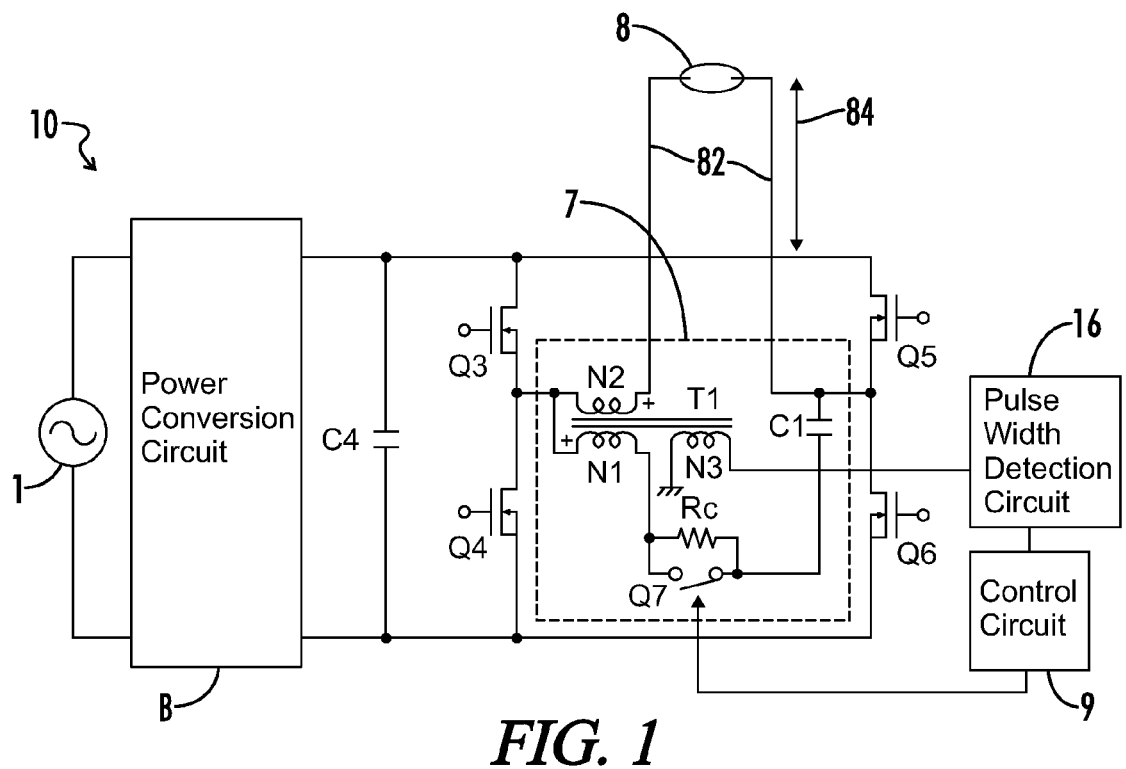
FIG. 1 is a circuit diagram in accordance with a first embodiment of the invention.

FIG. 1 is a circuit diagram in accordance with a first embodiment of the high-voltage discharge lamp lighting device 10. Power from a commercial AC power source 1 is converted into a predetermined DC voltage by a power conversion circuit B. The power conversion circuit B is formed of, for example, a full-wave rectifier for rectifying the AC power from the commercial AC power source 1, a step-up chopper circuit for stepping up the rectified output and a step-down chopper circuit for stepping down the output from the step-up chopper circuit. The output voltage of the power conversion circuit B is charged into a capacitor C4 and applied to a full bridge circuit formed of switching elements Q3, Q4, Q5, and Q6. The full bridge circuit is formed by parallel connection of a series circuit including switching elements Q3 and Q4 to a series circuit including switching elements Q5 and Q6, and converts a voltage of the capacitor C4 into a low-frequency rectangular wave voltage by alternating a period in which the switching elements Q3 and Q6 are turned ON and a period in which the switching elements Q4 and Q5 are turned ON at low frequency, further supplying the rectangular wave voltage to a load circuit.

The load circuit is formed of a starting pulse generation circuit 7 and a high-voltage discharge lamp 8. One end of each of a primary winding N1 and a secondary winding N2 of a pulse transformer T1 is connected to a connection point between the oscillating switching elements Q3 and Q4. The other end of the secondary winding N2 of the pulse transformer T1 is connected to one end of the high-voltage discharge lamp 8 via a wiring part 82 or lamp terminal wire 82 of a predetermined length 84 and the other end of the high-voltage discharge lamp 8 is connected to a connection point between the switching elements Q5 and Q6 via the wiring part 82 of predetermined length 84. One end of the capacitor C1 is connected to a connection point between the switching elements Q5 and Q6, and a parallel circuit formed of the single switching element Q7 and a resistor Rc is connected between the other end of the capacitor C1 and the other end of the primary winding N1 of the pulse transformer T1. One end of a tertiary winding N3 or reference winding N3 of a pulse transformer T1 is grounded, and a voltage at the other end of the tertiary winding N3 is monitored by a pulse width detection circuit 16.

Next, operation of the circuits shown in FIG. 1 will be described. In the circuit diagram of FIG. 1, when the power is turned on, the power conversion circuit B starts its operation. The power conversion circuit B rectifies power from the commercial AC power source 1 via the internal rectifying circuit and outputs a predetermined DC voltage via the internal step-up/down chopper circuits. First, the switching elements Q3 and Q6 are simultaneously turned ON to charge the capacitor C1 via the primary winding N1 and the charge resistor Rc of the transformer T1. Then, the switching elements Q3 and Q6 are turned OFF and then, the switching elements Q4 and Q5 are simultaneously turned ON, so that a voltage obtained by adding the voltage charged into the capacitor C1 to the voltage of the capacitor C4 is applied to the switching element Q7. After that, by turning ON the switching element Q7 at a predetermined time, a current flows through the capacitor C1, the switching element Q7 and the primary winding N1, and a pulse voltage is induced in the primary winding N1. A higher voltage occurs in the secondary winding N2 according to a turn ratio of the primary winding N1 to the secondary winding N2. This high voltage becomes a starting pulse voltage necessary for turning on the high-voltage discharge lamp 8.

A detection voltage for detecting the high voltage generated in the secondary winding N2 (corresponding to a turn ratio of the secondary winding N2 to the tertiary winding N3) occurs in the reference winding N3 or tertiary winding N3 of the pulse transformer T1. The pulse width detection circuit 16 for detecting a pulse width can be formed of, for example, a microcomputer equipped with a timer circuit capable of counting an elapsed time from detection of a rising zero crossing of the reference voltage generated in the tertiary winding N3 to detection of a falling zero crossing of the reference voltage. Therefore, the pulse width detection circuit 16 need not be able to accurately measure the magnitude of amplitude of the pulse voltage and thus, variation in reference voltage values due to variation in component values can be easily prevented.

Figure 2:
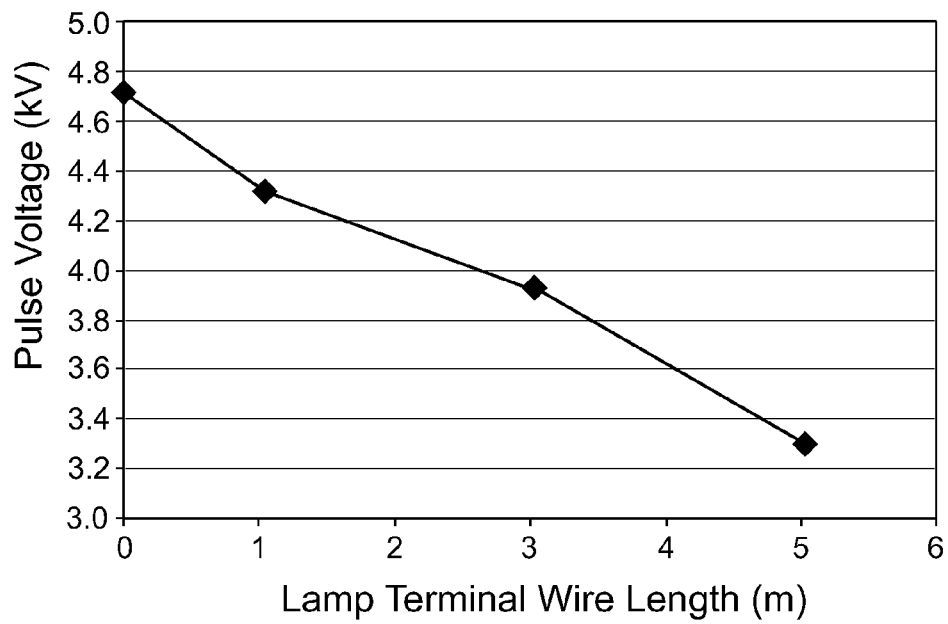
FIG. 2 is a graphical illustration demonstrating the relationship between a pulse voltage and a lamp terminal wire length in accordance with the first embodiment of the invention.
Figure 3:
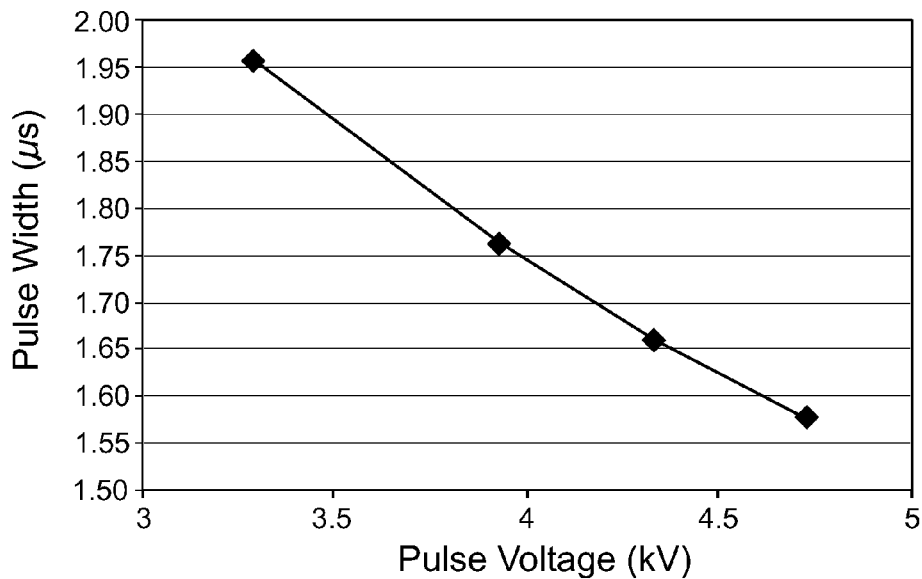
FIG. 3 is a graphical illustration demonstrating the relationship between the pulse voltage and a pulse width in accordance with the first embodiment of the invention.

FIG. 2 shows the relationship between a pulse voltage peak value and a lamp terminal wire length 84. Generally, as the wire length 84 increases, the pulse voltage peak value lowers. FIG. 3 shows the relationship between the pulse voltage peak value and a pulse voltage zero value width. It is recognized that as the pulse voltage peak value lowers, the pulse voltage zero value width increases. FIG. 4 to FIG. 7 show waveforms obtained by measuring the actual pulse voltage peak value and pulse width in the case where the lamp terminal wire length 84 is extended. As shown in waveform charts of FIG. 4 to FIG. 7, the pulse width detection circuit 16 initiates measurement of the pulse width at the instant when the pulse voltage starts to rise and finishes measurement of the pulse width at the instant when the pulse voltage returns to substantially zero. The pulse width detection circuit 16 determines the zero value width of the detected pulse voltage, and based on the result controls ON timing and ON impedance of the switching element Q7 via a control circuit 9.

Here, when the ON timing of the switching element Q7 is delayed after polarity reversal of the full bridge circuit, since the voltage of the capacitor C1 is slightly attenuated due to moderate discharge via the resistor Rc and then generates the pulse voltage, the peak value of the pulse voltage can be controlled to be low. Conversely, when the switching element Q7 is rapidly turned ON after polarity reversal of the full bridge circuit, since the pulse voltage is generated prior to attenuation of the voltage of the capacitor C1, the peak value of the pulse voltage can be controlled to be high.

If the ON impedance of the switching element Q7 is made variable as a substitute for control of, or to supplement control of, the ON timing of the switching element Q7, the peak value of the pulse voltage can be variably controlled with higher accuracy. For example, if the ON impedance of the switching element Q7 is made higher, the pulse voltage having a wide voltage range with low peak value is generated, and if the ON impedance of the switching element Q7 is made lower, the pulse voltage having a narrow voltage range with high peak value is generated.

Various additional embodiments are anticipated as adaptable to variably control the peak value of the pulse voltage and are not limited to the above-mentioned embodiment. The detection result of the pulse width detection circuit 16 may be fed back to the power conversion circuit B to make the voltage of the capacitor C4 variable. Alternatively, by variably controlling the frequency of polarity reversal of the switching elements Q3 to Q6 of the full bridge circuit, charge voltage of the capacitor C1 may be made variable.

TABLE 1

| Lamp terminal wire length (m) | Pulse voltage (kV) |
|---|---|
| 0 | 4.72 |
| 1 | 4.32 |
| 3 | 3.92 |
| 5 | 3.28 |

TABLE 2

| Pulse voltage (kV) | Pulse width (µS) |
|---|---|
| 4.72 | 1.58 |
| 4.32 | 1.66 |
| 3.92 | 1.76 |
| 3.28 | 1.96 |

The relationship between various lamp terminal wire lengths 84 and pulse voltages as from FIG. 2 is shown in Table 1. Detection values of the pulse voltage before step-down are used in this table, since the relationship between a breakdown voltage of the high-voltage discharge lamp 8 and pulse voltage is more clearly shown by using original pulse voltage than using the reference voltage of the tertiary winding N3 stepped-down according to the turn ratio of the tertiary winding N3 to the secondary winding N2.

The relationship between the pulse voltage and the pulse width in FIG. 3 is shown in Table 2. In fact, for the pulse width, the zero value width of the reference voltage of the tertiary winding N3 is detected.

Assuming that the starting pulse voltage of 4.0 kV or more is required based on a dielectric breakdown property of the high-voltage discharge lamp 8, when the zero value width of the pulse voltage detected by the pulse width detection circuit 16 is 1.75 or more μsec in the graph of FIG. 3, the peak value of the pulse voltage is insufficient and thus the high-voltage discharge lamp 8 is not started and turned on. Accordingly, the ON timing or the ON impedance of the switching element Q7 is variably controlled by the control circuit 9 so that the zero value width of the pulse voltage becomes 1.75 μsec or less.

The value thus controlled can be held in the control circuit 9 so as to be applied also at the next pulse generation. When the control circuit 9 is formed of a microcomputer with a built-in EEPROM, for example, the controlled value may be held in the control circuit 9 by storing the value in the EEPROM.

By controlling the zero value width of the pulse voltage to be 1.75 μsec or less, the peak value of the pulse voltage of 4.0 kV or more can be ensured according to correlation shown in FIG. 3, enabling the high-voltage discharge lamp 8 to be started and turned on.

Although the winding at which detection of the reference voltage takes place is the tertiary winding N3 of the pulse transformer T1 in FIG. 1, a separate transformer for detection may be provided. For example, such independent transformer may be provided in parallel with the primary winding N1 or the secondary winding N2 of the pulse transformer T1 or at the base of a pair of wiring parts 82 leading to the high-voltage discharge lamp 8.

In this embodiment, to obtain a detection value corresponding to the peak value of the pulse voltage, the zero value width of voltage waveform in a low voltage region only needs to be detected. Thus, pulse voltage components in a high voltage region may be clamped by using a voltage protection element such as a Zener diode. Furthermore, high-accuracy measurement means such as a microcomputer can be advantageously used as a detection circuit.

Figure 8:
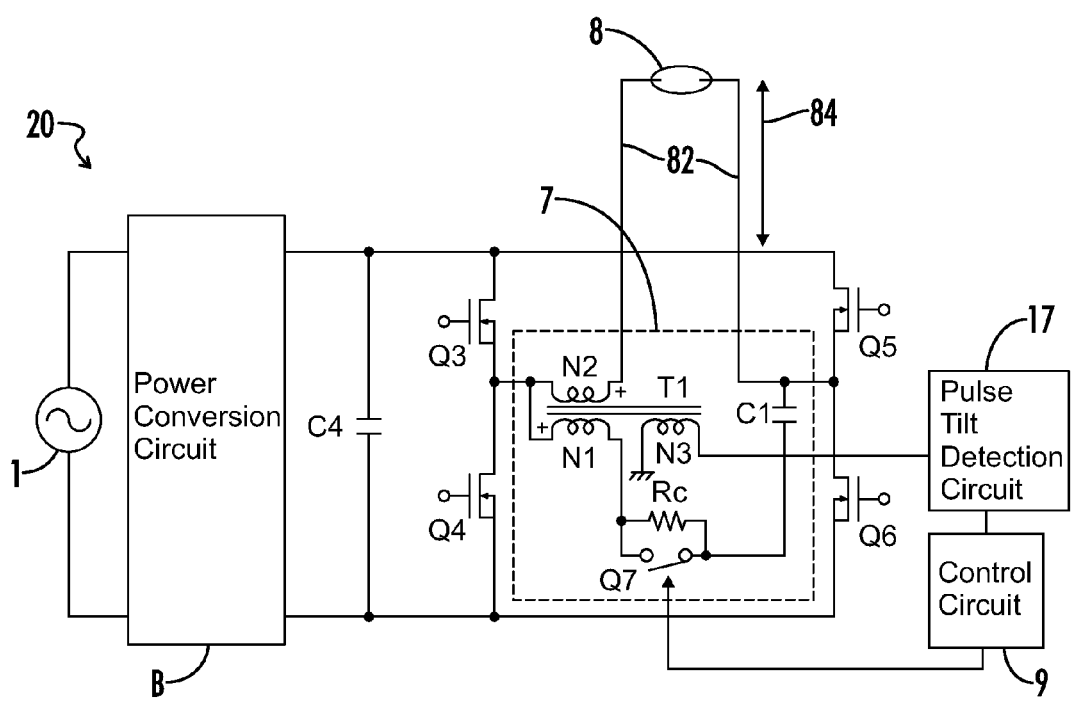
FIG. 8 is a circuit diagram in accordance with the second embodiment of the invention.

FIG. 8 is a circuit diagram in accordance with a second embodiment of the invention. In place of the pulse width detection circuit 16 in FIG. 1, a pulse tilt detection circuit 17 for detecting a tilt of the pulse voltage necessary for turning on the high-voltage discharge lamp 8 is provided. The pulse tilt detection circuit 17 for detecting the tilt of the pulse voltage can be formed of, for example, a microcomputer capable of first detecting the rising zero crossing of the pulse voltage and then detecting the voltage after a certain time period calculated by a timer circuit (the certain time period refers to a time period until at least the pulse voltage waveform reaches the peak from the rising zero crossing—that is, detecting dv/dt). The other configurations and operations are similar to those in the first embodiment.

Figure 9:
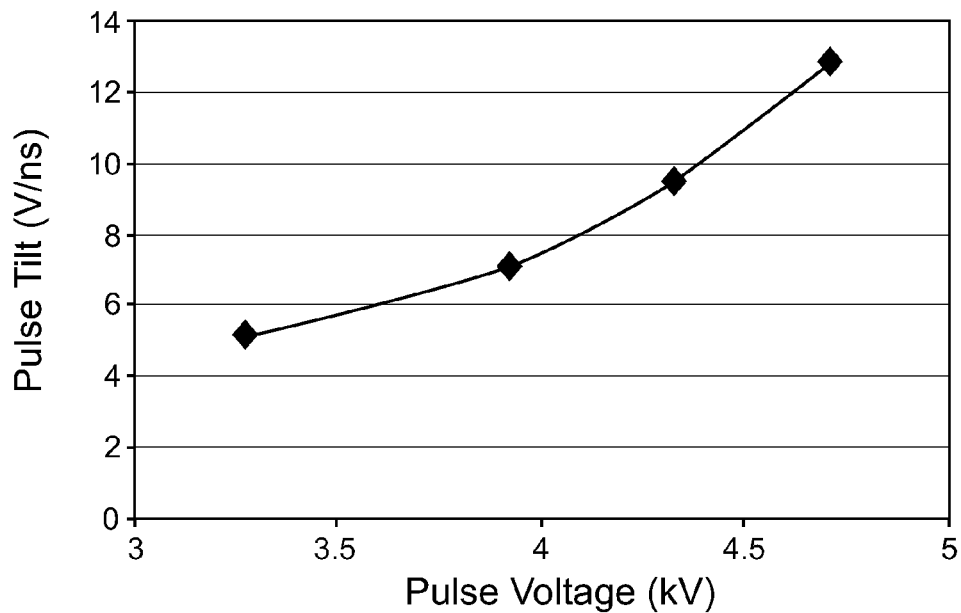
FIG. 9 is a graphical illustration of the relationship between the pulse voltage and a tilt in accordance with the second embodiment of the invention.

FIG. 9 shows the relationship between the peak value of the pulse voltage and tilt of the rising pulse voltage. It can be seen that as the pulse voltage peak value decreases, the tilt of the pulse voltage becomes gentler. FIGS. 4-7 show waveforms obtained by measuring the actual peak value of the pulse voltage (kV), zero value width (μs) and tilt (V/ns) in the case where the lamp terminal wire length 84 is extended. The waveform charts themselves are the same as those in the first embodiment.

Figure 4:
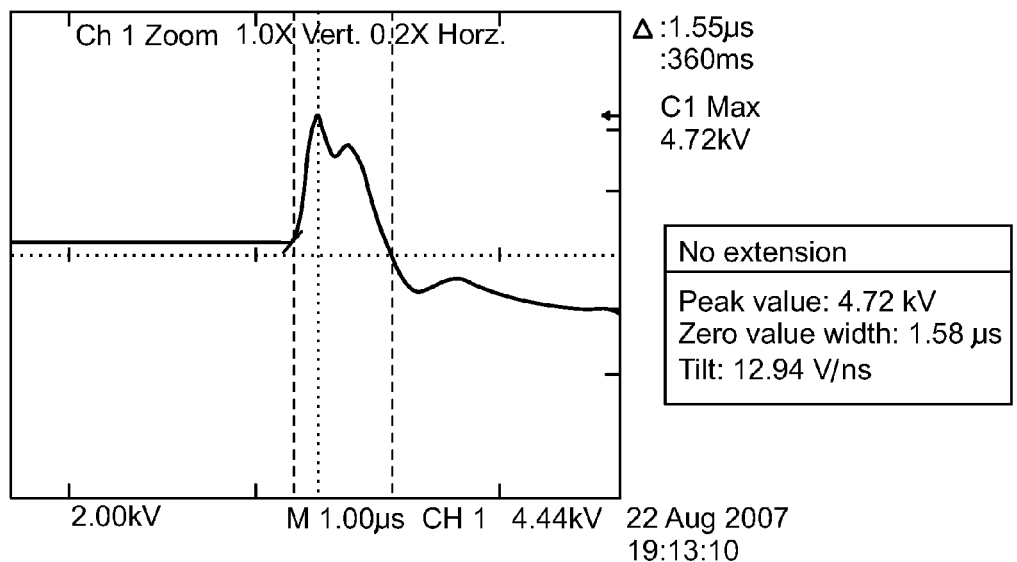
FIG. 4 is a waveform chart of a starting pulse voltage in accordance with first and second embodiments of the invention with the lamp terminal wire length being 0 m.
Figure 5:
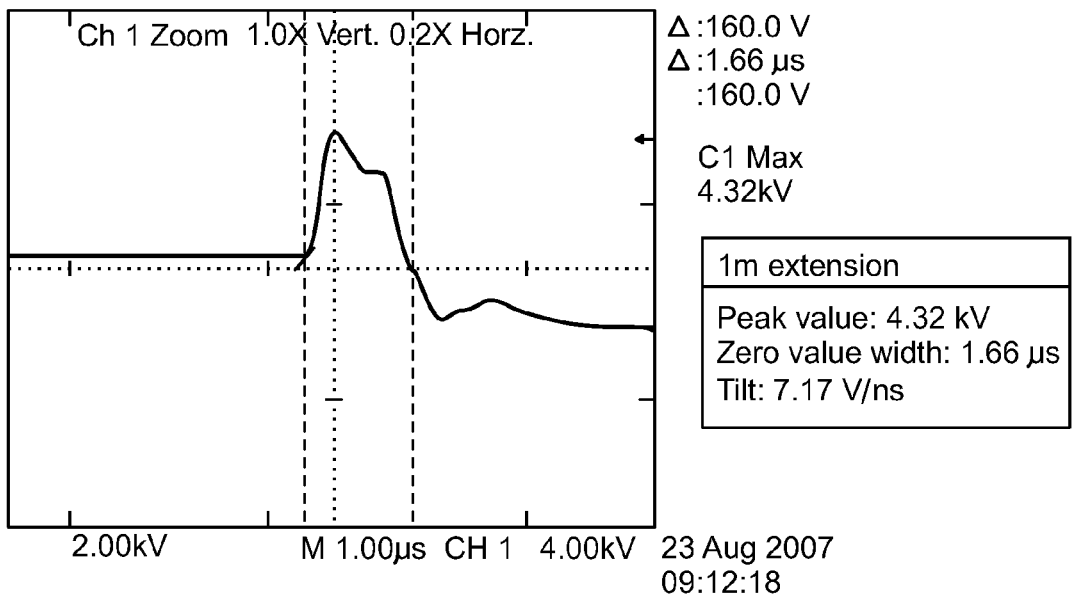
FIG. 5 is a waveform chart of the starting pulse voltage in accordance with the first and second embodiments of the invention with the lamp terminal wire length being 1 m.
Figure 6:
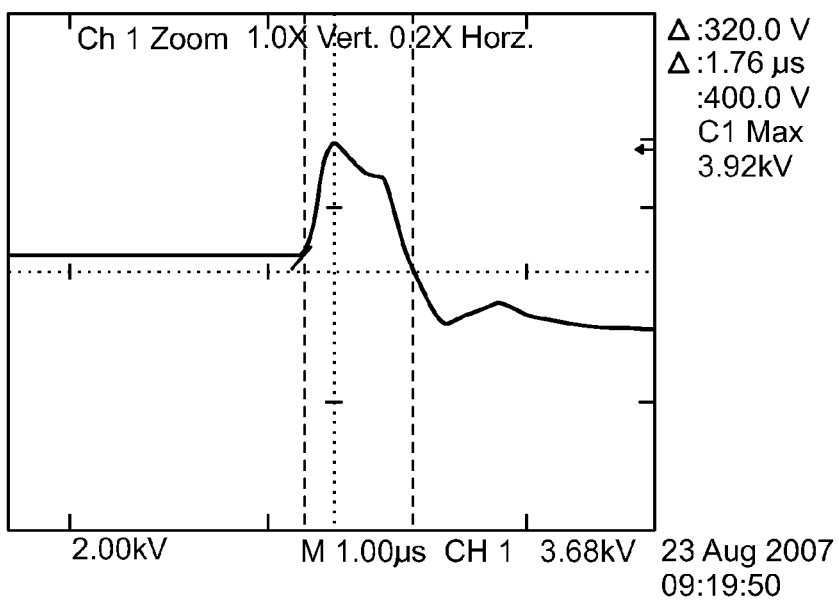
FIG. 6 is a waveform chart of the starting pulse voltage in accordance with the first and second embodiments of the invention with the lamp terminal wire length being 3 m.
Figure 7:
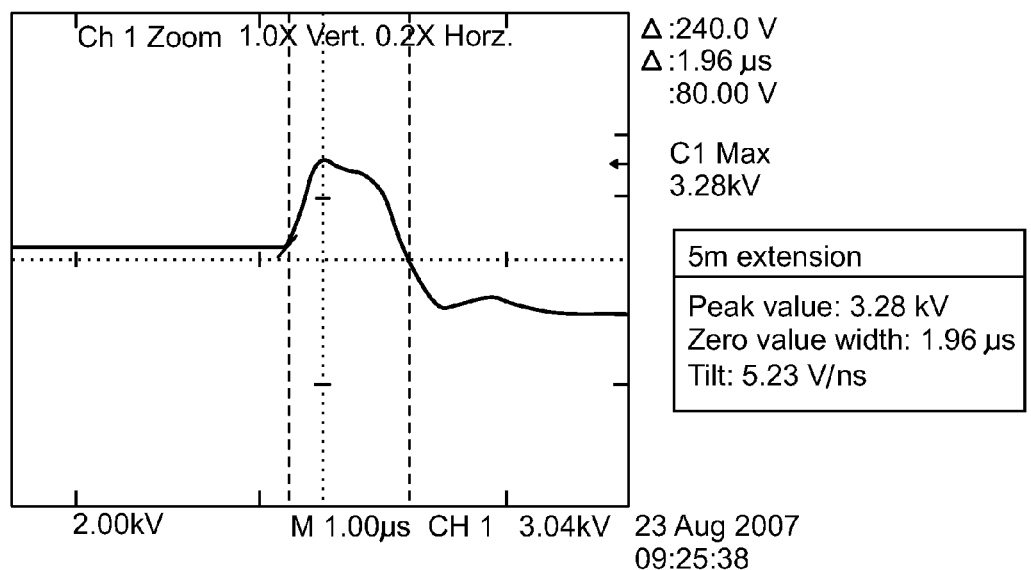
FIG. 7 is a waveform chart of the starting pulse voltage in accordance with the first and second embodiments of the invention with a lamp terminal wire length of 5 m.

When the wiring part 82 is not extended (lamp terminal wire length 84 of 0 m), as shown in FIG. 4, the peak value, the zero value width and the tilt of the pulse voltage are 4.72 kV, 1.58 μs and 12.94 V/ns, respectively. In the case of the wire length 84 of 1 m, as shown in FIG. 5, the peak value, the zero value width and the tilt of the pulse voltage is 4.32 kV, 1.66 μs and 9.60 V/ns, respectively. In the case of the lamp wire length 84 of 3 m, as shown in FIG. 6, the peak value, the zero value width and the tilt of the pulse voltage is 3.92 kV, 1.76 μs and 7.17 V/ns, respectively. In the case of the lamp wire length 84 of 5 m, as shown in FIG. 7, the peak value, the zero value width and the tilt of the pulse voltage is 3.28 kV, 1.96 μs and 5.23 V/ns, respectively. The relationship between the peak value of the pulse voltage and the tilt of the rising pulse voltage is shown in Table 3.

TABLE 3

| Pulse voltage (kV) | Pulse tilt (V/ns) |
| --- | --- |
| 4.72 | 12.94 |
| 4.32 | 9.60 |
| 3.92 | 7.17 |
| 3.28 | 5.23 |

Assuming that the starting pulse voltage of 4.0 kV or more is required based on dielectric breakdown property of the high-voltage discharge lamp 8, when the tilt of the pulse voltage detected by the pulse tilt detection circuit 17 is 8 V/ns or less in the graph of FIG. 9, the peak value of the pulse voltage is insufficient and thus, the high-voltage discharge lamp 8 is not started and turned on. Accordingly, the ON timing or the like of the switching element Q7 is controlled by the control circuit 9 so that the tilt of the pulse voltage becomes 8 V/ns or more. The value thus controlled can be held in the control circuit 9 so as to be applied also at the next pulse generation.

By controlling the tilt of the pulse voltage to be 8 V/ns or more, the peak value of the pulse voltage of 4.0 kV or more can be ensured according to correlation shown in FIG. 9, enabling the high-voltage discharge lamp 8 to be started.

According to this embodiment, to obtain a detection value corresponding to the peak value of the pulse voltage the tilt of voltage waveform in a low voltage region only needs to be detected. Thus, pulse voltage components in a high voltage region may be clamped by using a voltage protection element such as a Zener diode. Furthermore, a high-accuracy measurement means such as a microcomputer can be advantageously used as a detection circuit.

Figure 10:
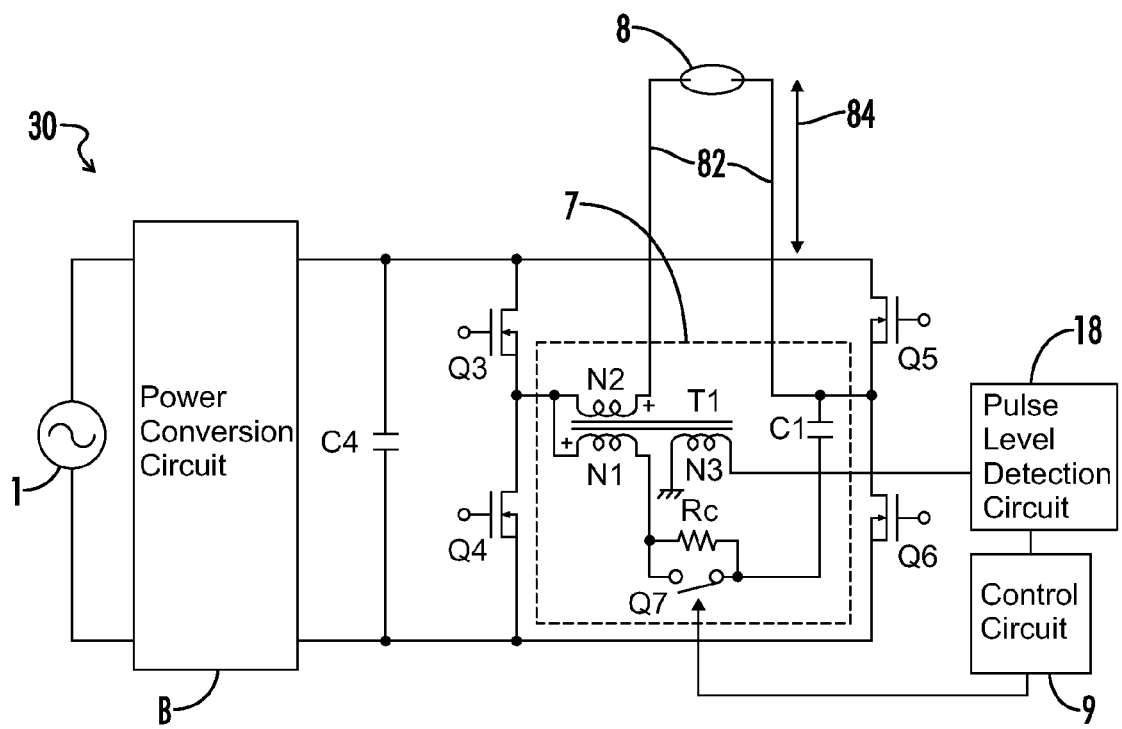
FIG. 10 is a circuit diagram in accordance with a third embodiment of the invention.

FIG. 10 is a circuit diagram in accordance with a third embodiment of the invention. In this embodiment, in place of the pulse width detection circuit 16 in FIG. 1, a pulse level detection circuit 18 for detecting a level of the pulse voltage necessary for turning on the high-voltage discharge lamp 8 is provided. As shown in FIG. 10, the pulse level detection circuit 18 is configured so that reference levels in plural stages are set, a corresponding detection circuit is triggered at the time when the pulse voltage generated in the tertiary winding N3 exceeds any of the set reference levels, and the triggered detection circuit outputs a Hi signal. As shown in Table 4, a correction value of the pulse voltage is determined according to a pattern of the Hi signals output from each detection circuit. The other configurations and operations are the same as those in the first embodiment.

TABLE 4

|  | Level 1 detection | Level 2 detection | Level 3 detection | Correction value |
|---|---|---|---|---|
| Pattern 1 (waveform A) | Hi | Hi | Hi | +0 V |
| Pattern 2 (waveform B) | Low | Hi | Hi | +500 V |
| Pattern 3 (waveform C) | Low | Low | Hi | +1000 V |

Figure 11:
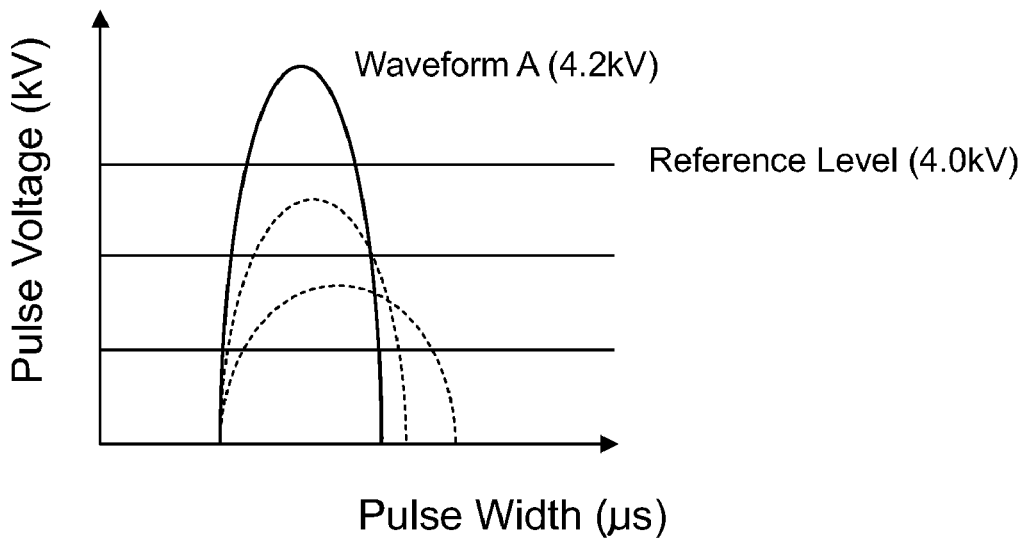
FIG. 11 is a graphical illustration in accordance with the third embodiment of the invention.

FIG. 11 shows the relationship between the pulse voltage peak value and the reference levels. For a waveform A (peak value of 4.2 kV) represented by a solid line, waveform B (peak value of 3.7 kV) represented by a dashed line and a waveform C (peak value of 3.2 kV) represented by a broken line, Table 4 shows specific examples of the correction values based on comparison results of the plurality of reference levels (4.0 kV, 3.5 kV, 3.0 kV).

Assuming that the starting pulse voltage of 4.0 kV or more is required based on dielectric breakdown property of the high-voltage discharge lamp 8, when states of patterns 2 and 3 in Table 4 are detected, the pulse voltage is insufficient and thus, the high-voltage discharge lamp 8 cannot be turned on. For this reason, the ON timing or the like of the switching element Q7 is controlled by the control circuit 9 so that the correction value based on Table 4 may be added.

Specifically, the reference levels 1, 2 and 3 in FIG. 11 are preset in the pulse level detection circuit 18. The number of the reference levels and set values are arbitrary. For example, when the waveform A in FIG. 11 is observed as the pulse voltage, since the pulse voltage exceeds all of the reference levels 1, 2 and 3, as shown in Table 4, the output of each detection circuit becomes Hi. In this case, it is determined that the peak value of the pulse voltage necessary for the high-voltage discharge lamp 8 has been ensured and correction is not performed.

Next, when waveform B in FIG. 11 is observed as the pulse voltage, outputs of the detection circuits corresponding to the reference levels 2 and 3 become Hi and an output of the detection circuit corresponding to the reference level 1 becomes Low. In this case, it is determined that the peak value of the pulse voltage necessary for the high-voltage discharge lamp 8 has not been ensured. However, since an output of the detection circuit corresponding to the reference level 2 has become Hi, the pulse voltage of 3.5 kV can be ensured. Thus, the correction value is +500 V.

Next, when waveform C in FIG. 11 is observed as the pulse voltage, an output of the detection circuits corresponding to the reference level 3 becomes Hi and outputs of the detection circuits corresponding to the reference levels 1 and 2 become Low. Also in this case, it is determined that the peak value of the pulse voltage necessary for the high-voltage discharge lamp 8 has not been ensured. However, since the output of the detection circuit corresponding to the reference level 3 has become Hi, the pulse voltage of 3.0 kV can be ensured. Thus, the correction value is +1000 V.

By correcting the peak value of the pulse voltage so as to cover a shortage according to such level detection based on comparison of the reference levels in plural stages, the peak value of the pulse voltage necessary for the high-voltage discharge lamp 8 can be ensured. As a matter of course, by setting the reference levels minutely, correction of the pulse voltage is further fragmented.

The value thus controlled can be held in the control circuit 9 so as to be applied also at the next pulse generation.

Note that the pulse level detection circuit 18 in FIG. 10 may be used as the detection means adapted to detect the magnitude (amplitude) of the pulse voltage as well as detection means adapted to directly or indirectly detect magnitude of the pulse voltage, such as detecting zero value width or pulse tilt of the pulse voltage.

In each of the above-mentioned embodiments, a combination of a polarity reversal circuit comprising the full bridge circuit including the switching elements Q3 to Q6 and the power conversion circuit B for supplying a predetermined DC voltage to the polarity reversal circuit is used as a rectangular wave output circuit for supplying rectangular wave power to the high-voltage discharge lamp 8. However, a half bridge circuit may be used in place of the full bridge circuit to form the polarity reversal circuit. Furthermore, by using the switching elements for polarity reversal of the full bridge circuit or the half bridge circuit also as switching elements for power exchange, the power conversion circuit may be integrated with the bridge circuit for polarity reversal.

Figure 12:
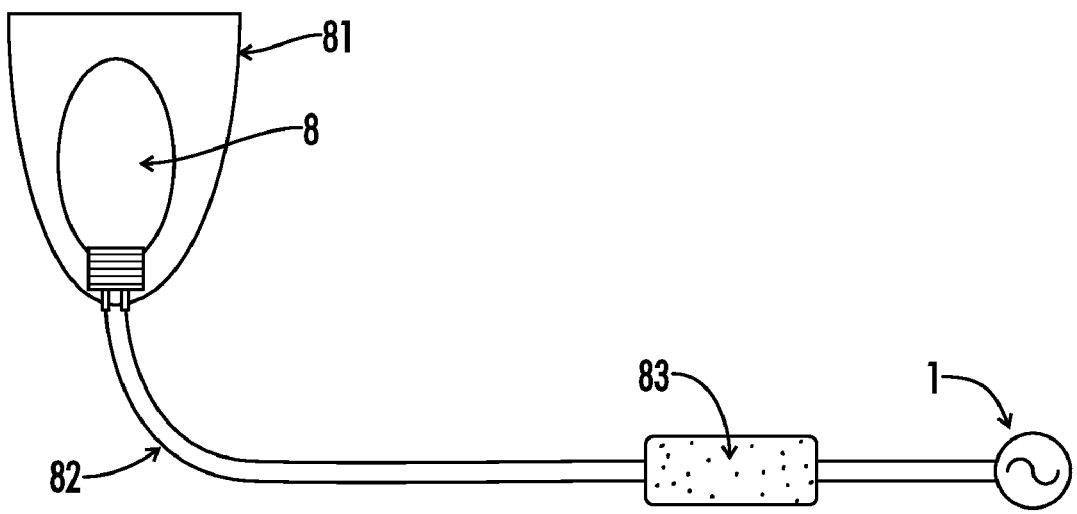
FIG. 12 is a schematic configuration view of a lighting fixture in accordance with a fourth embodiment of the invention.

FIG. 12 shows an example of configuration of lighting fixture using the high-voltage discharge lamp lighting device of the present invention. In this figure, reference numeral 8 denotes the high-voltage discharge lamp, reference numeral 81 denotes a lamp body to which the high-voltage discharge lamp is attached, reference numeral 82 denotes the wiring part and reference numeral 83 denotes a ballast in which circuits of the lighting device are stored. A lighting system may be formed by combining these lighting fixtures. By using the high-voltage discharge lamp lighting device in any of the first, second or third embodiments as the lighting devices, the peak value of the starting pulse can be appropriately obtained and the lamp can be started even when the wiring part 82 is long.

Figure 13:
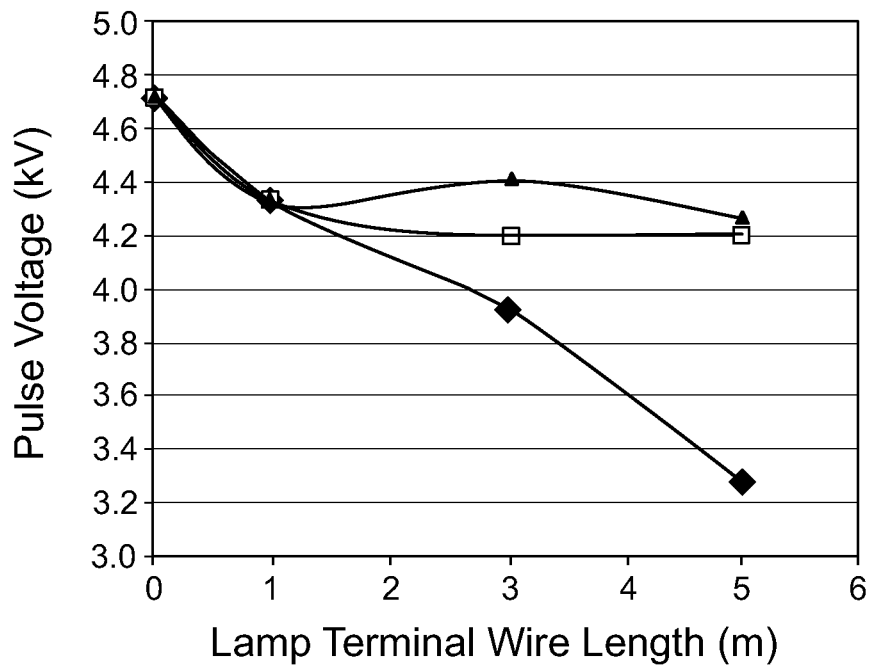
FIG. 13 is a graphical illustration of the lighting fixture in accordance with the fourth embodiment of the invention.
Figure 14:
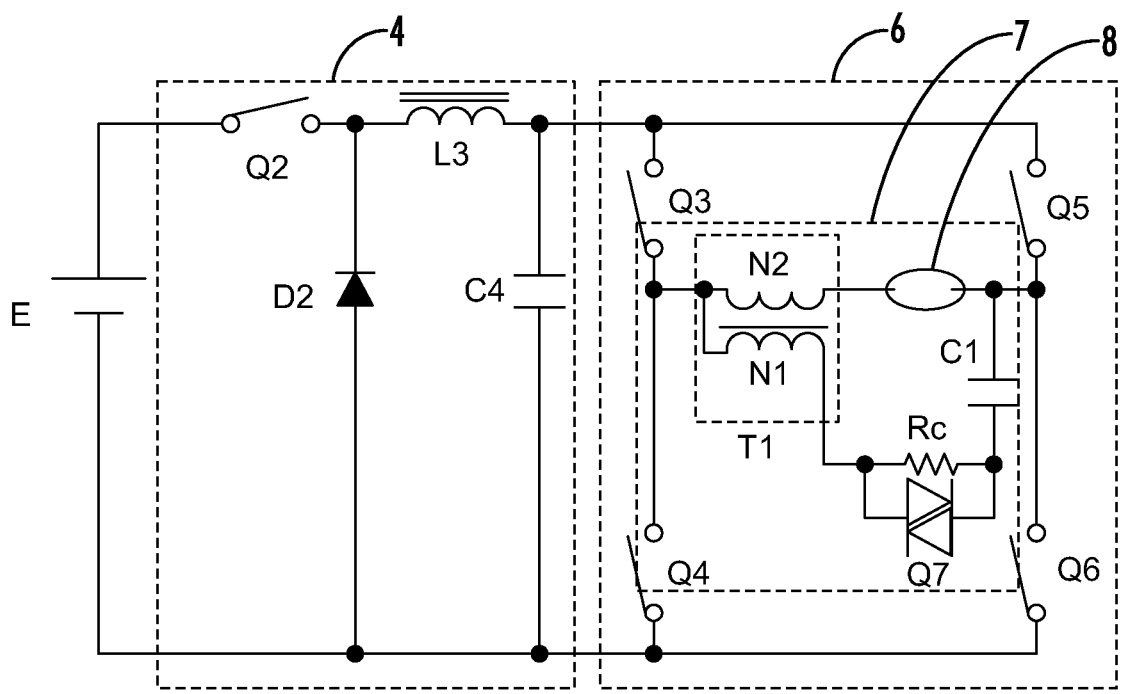
FIG. 14 is a circuit diagram as disclosed in the prior art.
Figure 15:
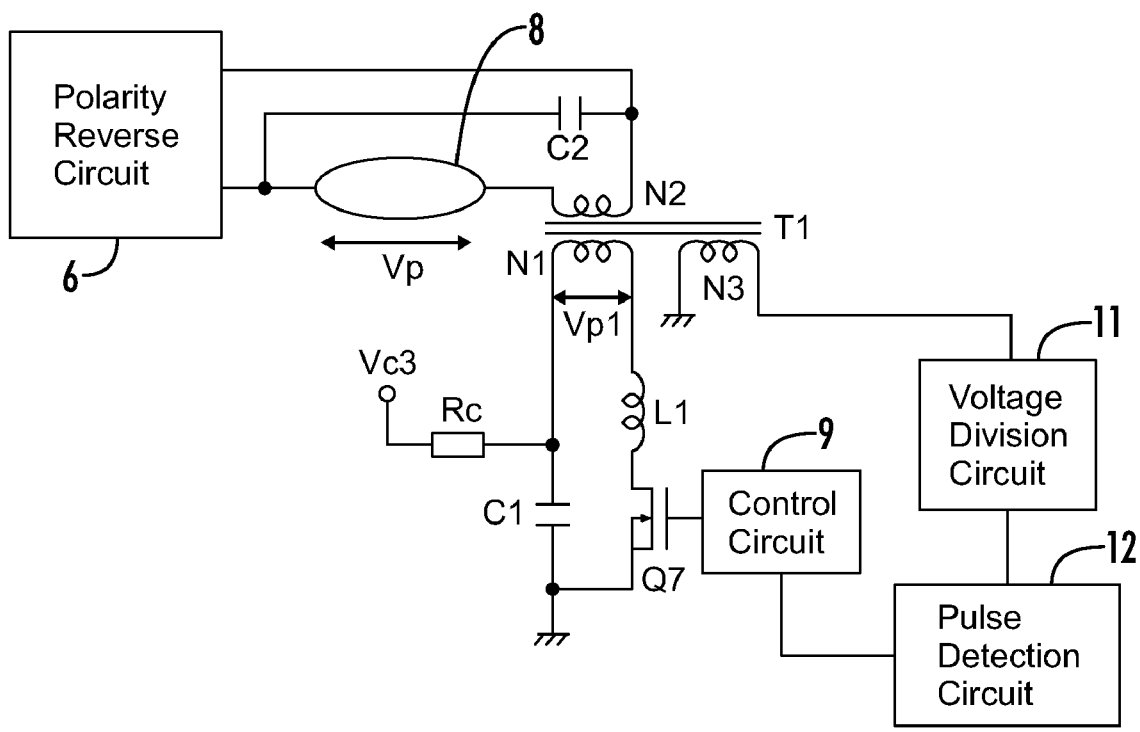
FIG. 15 is another circuit diagram as disclosed in the prior art.

FIG. 13 shows a summary of correction of the peak value of the pulse voltage according to the invention. In this figure, ♦ represents the characteristic in the case of no correction, □ represents the characteristic in the case of correction by detection of zero value width or tilt of the pulse voltage in accordance with the first or second embodiment and ▲ represents the characteristic in the case of correction based on comparison results of the reference levels in plural stages in accordance with the third embodiment. In the third embodiment, in the case of the lamp terminal wire length 84 of 1 m correction is not performed, in the case of the lamp terminal wire length 84 of 3 m correction of +500V is applied, and in the case of the lamp terminal wire length 84 of 5 m correction of +1000V is applied.

By mounting the high-voltage discharge lamp lighting device in which the starting pulse voltage is not attenuated even when the output wire length 84 is extended, the wiring part 82 can be extended in the range of 1 to 5 m, for example. Therefore, there are various advantages such as improved ease of construction in that the ballast 83 can be installed together, the routing distance of a power wire is shortened and the ballast 83 can be inspected together.

Thus, although there have been described particular embodiments of the present invention of a new and useful High Voltage Discharge Lamp Lighting Device it is not intended that such references be construed as limitations upon the scope of this invention except as set forth in the following claims.

What is claimed is:

1. A high-voltage discharge lamp lighting device for providing a starting pulse voltage to turn on a high-voltage discharge lamp having terminal wire connections of variable length, the device comprising:
   a rectangular wave output circuit;

a starting pulse generation circuit operable to receive rectangular AC power from the rectangular wave output circuit, the starting pulse generation circuit further comprising
   a transformer primary winding circuit comprising a series connection of at least a capacitor, a switching element and a primary winding of a transformer,
   a transformer secondary winding connected on one end to the high-voltage discharge lamp, wherein a first voltage generated in the primary winding of the transformer is stepped up to a starting pulse voltage and applied to the high-voltage discharge lamp, and
   a reference transformer winding, wherein a reference voltage is generated representative of the starting pulse voltage;
a starting pulse equivalent value detection circuit connected to the reference winding, said detection circuit operable to detect a value representative of a peak value of the starting pulse voltage; and
a control circuit operable to receive said value from said detection circuit, and further operable to control a frequency of the switching element in association with said value, wherein said frequency is further associated with the peak value of the starting pulse voltage.

2. The device of claim 1, wherein the reference winding comprises a tertiary winding, wherein the reference voltage is generated representative of the starting pulse voltage, and wherein the starting pulse equivalent value detection circuit is connected to the tertiary winding and receives the reference voltage from the tertiary winding.

3. The device of claim 1, wherein the reference winding comprises an independent transformer winding, wherein the reference voltage is generated reference of the starting pulse voltage, and wherein the starting pulse equivalent value detection circuit is connected to the independent transformer winding and receives the reference voltage from the independent transformer winding.

4. The device of claim 1, wherein the value detected by the starting pulse equivalent value detection circuit comprises a pulse width of the reference voltage generated in the reference winding.

5. The device of claim 4, wherein the starting pulse equivalent value detection circuit further comprises a timing circuit operable to measure an elapsed time between a rising zero crossing and a falling zero crossing of the reference voltage.

6. The device of claim 5, wherein the control circuit controls the frequency of the switching element, and correspondingly the starting pulse voltage applied to the high-voltage discharge lamp, in association with the elapsed time between the zero crossings.

7. The device of claim 6, wherein the control circuit further comprises a microcomputer operable to store the value detected by the starting pulse equivalent value detection circuit for application at a next pulse generation.

8. The device of claim 1, wherein the control circuit is further operable to control the ON impedance of the switching element.

9. The device of claim 1, wherein the starting pulse equivalent value detection circuit is further operable to output the detected value representative of the peak value of the starting pulse voltage to the rectangular wave output circuit, and wherein the rectangular AC power received by the starting pulse generation circuit is variably controlled by the detected value.

10. The device of claim 1, wherein the value detected by the starting pulse equivalent value detection circuit representative of a peak value of the starting pulse voltage further comprises a tilt of the starting pulse voltage necessary for startup of the lamp.

11. The device of claim 10, the detection circuit further comprising a microcomputer and a timing circuit,
   the microcomputer operable to detect a rising zero crossing of the reference voltage and to detect the reference voltage after a time period,
   the timing circuit operable to calculate the time period, wherein the time period is representative of at least the time between the rising zero crossing of the reference voltage and the peak value of the reference voltage, and
   wherein the tilt of the starting pulse voltage is representative of the peak value of the reference voltage with respect to the time period.

12. The device of claim 1, wherein the starting pulse equivalent value detection circuit has at least one reference level, each reference level having an associated correction value,
   wherein the detection circuit is operable to compare the reference voltage waveform and the reference levels and generate the appropriate correction value to the control circuit, and
   wherein the control circuit is operable to control the switching element and cause the starting pulse voltage to be supplemented by the correction value.

13. A method of providing a starting pulse voltage sufficient to turn on a high-voltage discharge lamp having terminal wire connections of variable length, the method comprising:
   (a) generating a rectangular wave AC signal;
   (b) inducing a low pulse voltage corresponding with the generated AC signal in a primary winding of a transformer;
   (c) stepping up the low pulse voltage to a high pulse voltage in a secondary winding of the transformer and supplying the high pulse voltage across the wire connections to the high-voltage discharge lamp, wherein the step further comprises starting up the lamp if the high pulse voltage comprises a starting pulse voltage sufficient to start up the lamp;
   (d) generating a reference voltage representative of the high pulse voltage;
   (e) detecting a control value representative of a peak value of the reference voltage; and
   (f) controlling the low pulse voltage induced in the primary winding based on the control value, wherein a starting pulse voltage sufficient to start the high-voltage discharge lamp is generated in the secondary winding and supplied across the wiring connections to the lamp.

14. The method of claim 13, wherein step (f) further comprises controlling the low pulse voltage by variably controlling at least one of a frequency or an ON impedance of a switching element connected to the primary winding.

15. The method of claim 13, wherein step (f) further comprises controlling the low pulse voltage by variably controlling the rectangular wave AC signal.

16. The method of claim 13, wherein step (e) comprises detecting a pulse width of the reference voltage.

17. The method of claim 13, wherein step (e) comprises detecting a pulse tilt of the reference voltage.

18. The method of claim 13, wherein step (e) further comprises comparing the reference voltage to at least one reference level and generating a correction value associated with the appropriate reference level and step (f) further comprises supplementing the low pulse voltage with the correction value.

19. A high-voltage discharge lamp lighting device for providing a starting pulse voltage sufficient to turn on a high-voltage discharge lamp having terminal wire connections of variable length, the device comprising:
- a commercial AC power source input;
- a power conversion circuit coupled to the AC input and operable to rectify the AC input into a predetermined DC voltage output;
- a charging capacitor coupled to the power conversion circuit;
- a polarity reversal circuit coupled to the power conversion circuit and the charging capacitor, the polarity reversal circuit comprising at least one pair of oscillating switching elements connected in parallel and operable to provide a rectangular wave AC output signal to a transformer primary winding circuit further comprising a series connection of at least a capacitor, a single switching element and a primary winding of a transformer, wherein a low pulse voltage is induced in the primary winding;
- a transformer secondary winding connected on one end to the high-voltage discharge lamp, wherein the low pulse voltage is stepped up to a high pulse voltage and applied to the high-voltage discharge lamp;
- a reference transformer winding, wherein a reference voltage is generated representative of the high pulse voltage;
- a starting pulse equivalent value detection circuit connected to the reference winding, said detection circuit operable to detect a value associated with the reference voltage; and
- a control circuit operable to receive said value from said detection circuit, and further operable to variably control at least one of a frequency of the single switching element or an ON impedance of the single switching element in association with said value, wherein said frequency or ON impedance is further associated with a starting pulse voltage sufficient to start the high-voltage discharge lamp.

20. The device of claim 19, wherein the control circuit is connected to the power conversion circuit and further operable to variably control voltage of the charging capacitor in association with the value from the detection circuit.

21. The device of claim 19, wherein the control circuit is operable to variably control the frequency of the oscillating switching elements of the polarity reversal circuit.

* * * * *